(12) United States Patent
Visser et al.

(10) Patent No.: US 7,981,457 B2
(45) Date of Patent: *Jul. 19, 2011

(54) TASTE IMPROVING SUBSTANCES

(75) Inventors: Jan Visser, Huizen (NL); Harry Renes, Lelystad (NL); Chris Winkel, Bussum (NL); Nico Bouter, Blaricum (NL)

(73) Assignee: Quest International B.V. & Quest International Services B.V., GP Naarden (NL)

( * ) Notice: Subject to any disclaimer, the term of this patent is extended or adjusted under 35 U.S.C. 154(b) by 1048 days.

This patent is subject to a terminal disclaimer.

(21) Appl. No.: 11/578,443

(22) PCT Filed: Apr. 6, 2005

(86) PCT No.: PCT/NL2005/000259
§ 371 (c)(1),
(2), (4) Date: Jun. 14, 2007

(87) PCT Pub. No.: WO2005/096843
PCT Pub. Date: Oct. 20, 2005

(65) Prior Publication Data
US 2008/0038430 A1    Feb. 14, 2008

(30) Foreign Application Priority Data

Apr. 6, 2004  (EP) .................................. 04076080
Apr. 26, 2004  (EP) .................................. 04076247
Feb. 1, 2005  (EP) .................................. 05100657

(51) Int. Cl.
*A23L 1/226*  (2006.01)
*A23L 1/229*  (2006.01)

(52) U.S. Cl. ................. 426/537; 426/534; 426/650
(58) Field of Classification Search .............. 426/537; 544/244, 264; 536/27.1, 28.1
See application file for complete search history.

(56) References Cited

OTHER PUBLICATIONS

Rijke et al. 2007. LC-MS Study to Reduce Ion Suppression and to Identify N-lactoylguanosine 5'-monophosphate in bonito: A New Umami Molecule? J. Agric. Food Chem. 55, 6417-6423.*

* cited by examiner

*Primary Examiner* — Rena L Dye
*Assistant Examiner* — Saeeda Latham
(74) *Attorney, Agent, or Firm* — Abelman, Frayne & Schwab

(57) ABSTRACT

The present invention in a first aspect relates to taste improvement of foodstuffs, beverages, pharmaceutics, tobacco products and oral care products, using a substance according to formula (I), or edible salts thereof: formula (I): $R^1$—$CR^2(OR^3)$—CO—X. It was found that substances represented by formula (I) are capable of modifying and complementing, the sensory impact of taste imparting substances. Thus, the present taste improving substances are advantageously applied in flavour compositions, foodstuffs, pharmaceuticals, tobacco products and oral care products. Typical examples of taste improving substances according to the present invention include N-lactoyl GMP, N-lactoyl AMP, N-lactoyl CMP, N-lactoyl IMP, N-gluconyl GMP, N-gluconyl AMP, N-gluconyl CMP, N-gluconyl IMP, O-lactoyl-GMP, O-lactoyl AMP, O-lactoyl CMP, O-lactoyl IMP, O-gluconyl GMP, N-gluconyl AMP, O-gluconyl CMP and O-gluconyl IMP and the mixtures thereof.

17 Claims, No Drawings

TASTE IMPROVING SUBSTANCES

FIELD OF THE INVENTION

The present invention concerns taste improvement in foodstuffs, beverages, pharmaceutics, tobacco products and oral care products. More particularly, the present invention provides flavour compositions that can be used to confer a fuller and richer taste to foodstuffs, beverages, pharmaceutics, tobacco products and oral care products. The flavour compositions according to the invention are characterised by the presence of one or more substances that are capable of modifying and complementing the impact of other flavour imparting substances.

The present invention also encompasses the use of the aforementioned taste improving substances for improving the taste of foodstuffs, beverages, pharmaceutics, tobacco products and oral care products, as well as to foodstuffs, beverages, pharmaceutics, tobacco products and oral care products containing these substances.

BACKGROUND OF THE INVENTION

"Umami" is a term commonly used to describe the taste impact of L-glutamate salts and certain nucleotides. Umami is the main taste in the Japanese stock called "dashi", and in bouillon and other stocks. Glutamic acid is a major constituent of food proteins (plant and animal) such as those abundantly found in foods such as meat, poultry, seafood and vegetables. Two nucleotides that contribute most to the umami taste, GMP (guanosine monophosphate) and IMP (inosine monophosphate) are also present in many foods. By themselves these nucleotides do not typically give as powerful a flavour result as MSG (monosodium glutamate). However, due to a synergistic interaction with MSG, a pronounced enhancing effect can be observed if these nucleotides are used in combination with MSG.

The umami taste has characteristic qualities that differentiate it from other tastes. It has been convincingly shown that umami represents the fifth taste, in addition to the other four basic tastes sweet, acid, salt and bitter. The most common descriptors that are used to describe the umami taste include "savoury", "meaty" and "broth-like". "Umami" is literally translated as "delicious".

As alternatives to MSG and 5'-nucleotides, other molecules have been proposed as (umami-like) taste modulating substances:

Organic acids like tartaric and succinic acid have been reported to exhibit taste enhancing properties (Ney [1971] Z. Lebensm. Unters. Forsch. 146: 141; Velisek et al. [1978] Nahrung 22: 735). Taste modifying properties have also been attributed to certain di- to octa-peptides (Yamasaki and Maekawa [1978] Agric. Biol. Chem. 42: 1761; Noguchi et al. [1975] J. Agric. Food Chem. 23: 49).

WO 97/04667 discloses tripeptides containing a hydrophobic amino acid residue and at least one acidic amino acid residue as well as N-lactoyl-X substances, wherein X represents an amino acid residue, as flavouring ingredients to impart savoury taste and increase the mouthfeel of foodstuffs. It is also disclosed that these peptides and derivatives can partly mimic organoleptic features of MSG.

EP-A 1 252 825 discloses flavouring compositions for imparting umami taste to food products comprising substances that are formed by the reaction of the primary or secondary amino group of an amino acid, peptide or protein with the carbonyl group of a reducing sugar. According to this document the most preferred substances are those wherein the amino acid residue is selected from glutamic acid or aspartic acid and the sugar residue is selected from fructose, glucose, maltose, lactose, galactose, rhamnose, xylose and mannose.

EP-A 1 356 744 discloses flavouring compositions containing N-acetylglycine and the use thereof for imparting umami taste to foodstuffs.

As described above umami taste and umami imparting substances contribute to the flavour of foodstuffs, especially in the savoury range.

In sweet and beverage products, further examples of the importance of the gustative dimension of flavourings have been reported. These examples include taste attributes such as bitterness, tingling and cooling-freshness.

Bitterness is an essential aspect of some food flavours, among which chocolate taste. Purine alkaloids, like theobromine and caffeine, as well as amino acids and peptides have been known for a long time as bitter substances. In British patent no. GB 1420909 it is disclosed that the bitter flavour of cocoa can be reproduced using a combination of a purine alkaloid and an amino acid or an oligopeptide which 'produces a surprisingly more natural simultaneously bitter and astringent flavour note than either of these types of substances alone'.

Menthol, an important constituent of peppermint oil, has a strong impact on flavoured products not only because of its mint smell but also because it imparts a cooling and fresh taste. Next to mint flavoured products, it has been suggested to employ menthol in other types of flavour to impart a cool taste. US patent application no. US2005013846 for example discloses how menthol and derivatives thereof can be used as flavouring in water continuous spreadable acidified food products to obtain table spreads exhibiting a fresh, cool taste impression.

Similarly, cinnamic aldehyde and eugenol, constituents of cinnamon oil, are used in flavouring composition for confectionary products, not only for their smell but also because they impart a warm and tingling taste. The oral pungency of cinnamic aldehyde was described as burning and tingling by Cliff M and Heymann H [Journal of Sensory Studies 7 (1992) 279-290]. According to the same authors eugenol exhibits a long-lasting numbing effect. Cinnamon oil has been proposed as a taste improving flavouring. International patent application no. WO9006689 discloses that cinnamon oil, among other spice extracts, added to a minty flavour formulation, can be used to improve the long-lasting flavour of chewing-gum.

Although a lot of work has been focused on finding taste improving substances that are capable of imparting new exciting taste attributes, there still is a need for new taste improving substances, and in particular for taste improving substances that are suitable for use in both savoury and non-savoury applications.

SUMMARY OF THE INVENTION

The present inventors have surprisingly found that substances represented by the following formula (I) can be used advantageously to improve the taste of foodstuffs, beverages, pharmaceutics, tobacco products and oral care products:

$$R^1—CR^2(OR^3)—CO—X \qquad (I)$$

Therefore, the present invention relates to flavour compositions, foodstuffs, beverages, pharmaceutics, tobacco products and oral care products, comprising at least one substance according to formula (I).

Other aspects of the present invention relate to the use of said substances for improving the taste of foodstuffs, beverages, pharmaceutics, tobacco products and oral care products, and to a process for improving the taste of these products.

The taste improving substances according to the present invention can be applied advantageously to impart desirable taste attributes to the aforementioned products.

In addition, the present taste improving substances are capable of modifying the taste impact of other flavour ingredients contained within these same products, thereby improving the overall flavour quality of these products.

DETAILED DESCRIPTION OF THE INVENTION

Accordingly, the present invention in a first aspect relates to the use for improving the taste of foodstuffs, beverages, pharmaceutics, smoking tobacco or oral care products of a substance according to formula (I), or edible salts thereof:

$$R^1—CR^2(OR^3)—CO—X \quad (I)$$

wherein:
$R^1$ represents hydrogen; $C_1$-$C_8$ alkyl, $C_2$-$C_8$ alkenyl, $C_3$-$C_8$ cycloalkyl or $C_3$-$C_8$ cycloalkenyl, each optionally substituted with 1-8 substituents selected from hydroxyl, $C_1$-$C_3$ alkyl; $C_2$-$C_3$ alkenyl and $C_1$-$C_3$ carboxyl;
$R^2$ represents hydrogen; $C_1$-$C_8$ alkyl, $C_2$-$C_8$ alkenyl, $C_3$-$C_8$ cycloalkyl or $C_3$-$C_8$ cycloalkenyl, each optionally substituted with 1-8 substituents selected from hydroxyl, $C_1$-$C_3$ alkyl, $C_2$-$C_3$ alkenyl and $C_1$-$C_3$ carboxyl;
$R^3$ represents hydrogen; $C_1$-$C_3$ acyl or $C_1$-$C_3$ alkyl, each optionally substituted with 1-3 hydroxyl groups;
and wherein X represents either (i) a six membered heterocyclic ring, comprising at least two nitrogen atoms, which heterocyclic ring is optionally further substituted with one or more substituents selected from the group of amino; hydroxyl; oxo; alkyl; and monosaccharide unit, said monosaccharide unit optionally being esterified with one or more mono-, di- and/or triphosphate groups; or (ii) a bicyclic system comprising a five membered heterocyclic ring and a six membered heterocyclic ring, each ring comprising at least two nitrogen atoms, and each ring being optionally further substituted with one or more substituents selected from the group of amino; hydroxyl; oxo; alkyl; and monosaccharide unit, said monosaccharide unit optionally being esterified with one or more mono-, di- and/or triphosphate groups.

The present inventors have found that the above-mentioned substances are very useful flavour ingredients which, particularly in the presence of other flavouring substances, are capable of imparting highly appreciated taste sensations to the products in which they are incorporated, specifically "roundness", "fullness", "substance", "continuity", "complexity", "expanding", "long lasting", "late onset umami taste", "kokumi" and/or "yeasty". Because of this, the present taste improving substances can be employed to improve the taste (including "mouthfeel") of foodstuffs, beverages, pharmaceutics, tobacco products and oral care products.

The taste improving substances of the present invention as such are capable of imparting highly desirable taste attributes. In addition, it has been found that the taste improving substances according to the invention are capable of complementing and modifying the sensory impact of other flavouring substances contained in the aforementioned products, including complementing and modulating "sweet taste impact", "salt taste impact" and/or "bitterness".

Throughout this document the terms "taste" and "flavour" are used interchangeably to describe the sensory impact that is perceived via the mouth, especially the tongue, and the olfactory epithelium in the nasal cavity. The term "taste modifying" as used herein refers to the capability of a composition or substance to alter the taste impact of other, flavour imparting, substances present within the same product, with the proviso that this change in taste impact is not caused by the flavour contribution of said composition or substance per se, but instead that it mainly results from the combined effect of on the one hand the taste improving composition or substance and on the other hand the other flavour imparting substances. The present substances combine the capability of modifying the taste of other flavour substances with a taste contribution of their own. The favourable impact of the present taste improving substances is believed to be the result of the combination of these two effects.

Because the taste improving substances according to the invention are not particularly volatile, they do not produce a strong aroma impact, even though they can affect the aroma impact of other flavour substances. Here the term "aroma" refers to the aspect of taste that is perceived through the olfactory epithelium. Because of the low volatility of the present taste improving substances it is believed that the advantageous properties of these substances are somehow associated with the impact that these substances have on the sensory receptors located within the mouth.

It was found that particularly satisfying results can be obtained with taste improving substances according to formula (I) wherein X represents an optionally substituted purine or pyrimidine radical. The aforementioned purine or pyrimidine radical is advantageously substituted with at least one amino and/or at least one oxo group.

It is noted that in case X represents an unsaturated heterocyclic ring or ring system that is substituted with at least one oxo-group, enol-keto isomerisation may occur. Besides the keto tautomers explicitly defined in this document, also the enol tautomers are encompassed by the present invention.

According to a preferred embodiment, the purine or pyrimidine represented by X in formula (I) comprises at least one, more preferably at least two sites of unsaturation in the heterocyclic ring or ring system.

It is furthermore noted that in case X represents a ring or ring system having one or multiple (conjugated) sites of unsaturation, other intramolecular proton transfer reactions, i.e. other than the keto enol tautomerization described here above, can occur under many conditions, as will be appreciated by the skilled person. Hence, in this document, if X is to represent such an unsaturated ring or ring system having (multiple conjugated) sites of unsaturation, tautomers of these rings or ring systems resulting from such intramolecular proton transfer reactions are also encompassed.

The aforementioned purine and pyrimidine radicals are preferably substituted with a monosaccharide unit, especially a pentose of hexose monosaccharide unit, and most preferably a pentose monosaccharide unit. Ribose and deoxyribose are examples of pentose units which are advantageously incorporated in the present substances. The aforementioned monosaccharide unit preferably is esterified with one or more phosphate groups selected from monophosphate, diphosphate and triphosphate. Even more preferably the monosaccharide unit is esterified with one such phosphate group, monophosphate being most preferred.

According to another preferred embodiment, X represents an optionally substituted purine or a pyrimidine radical selected from the group of uracil, thymine, cytosine, guanine, adenine, hypoxanthine, xanthine, theophylline and theobromine, even more preferably, from the group of guanine, cytosine and adenine.

In a very preferred embodiment X represents guanosine monophosphate (GMP), adenosine monophosphate (AMP), cytidine monophosphate (CMP) or inosine monophosphate (IMP), more preferably X represents GMP, IMP or CMP, GMP and IMP being even more particularly preferred. Most preferably, X represents GMP. Here the term "monophosphate" also encompasses cyclic monophosphate.

According to another preferred embodiment, $R^1$ represents $C_2$-$C_8$ alkyl or $C_4$-$C_6$ cycloalkyl, said alkyl or cycloalkyl being substituted with 1-6 hydroxyl groups and/or 1-3 carboxyl groups. Even more preferably, $R^1$ represents $C_2$-$C_6$ alkyl, substituted with 2-6 hydroxyl groups. Most preferably, $R^1$ represents $C_3$-$C_5$ alkyl, substituted with 3-5 hydroxyl groups.

Alternatively, in another preferred embodiment $R^1$ represents hydrogen or $C_1$-$C_4$ alkyl, more preferably it represents $C_1$-$C_2$ alkyl, most preferably methyl.

In the aforementioned formula (I) $R^2$ preferably represents hydrogen or $C_1$-$C_4$ alkyl, most preferably hydrogen. Likewise, $R^3$ preferably represents hydrogen; or $C_1$-$C_3$ acyl, optionally substituted with 1-3 hydroxyl groups, more preferably it represents hydrogen or $C_1$-$C_3$ acyl or $C_2$-$C_3$ acyl substituted with 2-3 hydroxyl groups, most preferably $R^3$ represents hydrogen.

According to a preferred embodiment X represents a heterocyclic ring or ring system which is substituted with at least a pentose monosaccharide unit and the CO—X bond in formula (I) represents an ester bond. More particularly, it represents an ester bond connecting the $R^1$—$CR^2(OR^3)$—CO— moiety to an oxygen atom of a pentose monosaccharide unit substituted on the heterocyclic ring or ring system.

In another preferred embodiment of the invention the CO—X bond represents an amide bond, particularly an amide bond connecting the acyl group with an amino group substituted on the heterocyclic ring or ring system or with a nitrogen atom in the heterocyclic ring or ring system as described above. Most preferably, the amide bond connects the acyl group with a nitrogen atom substituted on the heterocyclic ring or ring system.

Hence, taste improving substances that are particularly preferred for improving the taste of foodstuffs, beverages, pharmaceutics, tobacco products and oral care products include N-lactoyl GMP, N-lactoyl AMP, N-lactoyl CMP, N-lactoyl IMP, N-gluconyl GMP, N-gluconyl AMP, N-gluconyl CMP and N-gluconyl IMP; N-lactoyl GMP and N-gluconyl GMP being particularly preferred.

According to another embodiment, taste improving substances that are particularly preferred for improving the taste of foodstuffs, beverages, pharmaceutics, tobacco products and oral care products include O-lactoyl-GMP, O-lactoyl AMP, O-lactoyl CMP, O-lactoyl IMP, O-gluconyl GMP, O-gluconyl AMP, O-gluconyl CMP and O-gluconyl IMP; O-lactoyl GMP, and O-gluconyl GMP being particularly preferred.

Another aspect of the invention relates to flavour compositions comprising at least 0.1 wt. % of flavouring substances and between 0.001 and 50 wt. %, preferably between 0.01 and 20 wt. % of one or more of the taste improving substances as defined herein before. Most preferably, the flavour composition contains at least 0.1 wt % of the present taste improving substances. Here the term "flavouring substance" refers to any substance that is capable of imparting a detectable flavour impact, especially at a concentration below 0.1 wt. %, more preferably below 0.01 wt. %.

In a preferred embodiment the flavour composition according to the invention comprises a flavouring substance in an amount of at least 0.5 wt %, preferably at least 1 wt %, based on the total weight of the composition.

Typically, in the present flavour composition the taste modifying compounds and flavouring substances as defined herein before are employed in a weight ratio within the range of 10:1 to 1:100, preferably in a weight ratio of 5:1 to 1:50.

The flavour composition according to the present invention may suitably be prepared in the form of a liquid, a paste or a powder. In a particularly preferred embodiment the flavour composition is a free flowing powder. The present flavour composition advantageously contains at least 0.5 wt % of a processed flavour, in particular a processed flavour that contains cystein derived Maillard reaction products.

Typical examples of flavour compositions according to the present invention include savoury flavourings, dairy flavourings, sour/acid flavourings, sweet flavourings and mint flavourings; savoury and dairy flavourings being particularly preferred.

In a particularly preferred embodiment flavouring compositions are provided comprising a taste improving substance selected from the group of N-Lactoyl GMP, O-lactoyl GMP, N-gluconyl GMP, O-gluconyl GMP and mixtures thereof, as well as a savoury flavour. Most preferably, this flavour composition is a meat flavouring or a cheese flavouring.

Yet another aspect of the present invention relates to a product selected from the group consisting of foodstuffs, beverages, pharmaceutics, tobacco products and oral care products, said product comprising one or more taste improving substances according to formula (I) or edible salts thereof. The advantageous taste improving characteristics were clearly observed in the aforementioned products containing the taste improving substances in a concentration of at least 0.0003 wt. %. Typically, the concentration does not exceed 0.5 wt %.

Surprisingly, it was found that much lower amounts of the present taste improving substances are sufficient to impart a desirable effect. Hence, according to another particular preferred embodiment, the present invention relates to a product selected from the group consisting of foodstuffs, beverages, pharmaceutics, tobacco products and oral care products, said product comprising at least 0.5 µg/kg, more preferably at least 1 µg/kg, most preferably at least 5 µg/kg of one or more of the taste improving substances according to formula (I) or edible salts thereof. According to this embodiment of the invention, the aforementioned products may suitably contain the taste improving substances in a concentration of not more than 1000 µg/kg, more preferably not more than 100 µg/kg, most preferably of not more than 50 µg/kg.

Typical examples of foodstuffs according to the present invention include soups, sauces, stocks, bouillons, cheese products, dressings, seasonings, margarines, shortenings, bread, pastry and noodles.

The term 'tobacco products', as used herein, refers to any type of tobacco product for smoking as well as non-smoking applications. It is furthermore noted that tobacco-like products are available for both smoking and non-smoking applications. The use of the present taste improving substances in tobacco substitutes is also encompassed by the present invention.

Yet another aspect the present invention relates to a process of improving the taste of a foodstuff, a beverage, a pharmaceutical product, a tobacco product or an oral care product, comprising adding to said foodstuff, beverage, pharmaceutical, tobacco product or oral care product one or more taste improving substances according to formula (I) and/or edible salts thereof. According to a first embodiment said substance may be added in an amount of at least 0.0003 wt. %, said amount not exceeding 0.5 wt %. According to another, particularly preferred embodiment the process comprises adding to said foodstuff, beverage, pharmaceutical or oral care product one or more taste improving substances according to formula (I) and/or edible salts thereof in an amount of at least 0.5 μg/kg, more preferably at least 1 μg/kg. Preferably said amount does not exceed 1000 μg/kg.

The taste improving substances according to formula (I) are suitably produced by reacting a substance XH with an α-hydroxyl carboxylate. Thus, yet another embodiment of the present invention relates to a process of producing a taste improving substance according to formula (I), comprising the step of reacting a substance XH with an α-hydroxyl carboxylate or an α-hydroxyl carboxylate derivative according to formula (II):

$$R^1—CR^2(OR^3)—COOR^4 \qquad (III)$$

or a salt of said carboxylate or derivative, wherein X, $R^1$, $R^2$ and $R^3$ have the same meaning as defined above in relation to formula (I); and wherein $R^4$ represents hydrogen or $C_1$-$C_3$ alkyl. The invention also encompasses reacting XH with a lactone that is formed by internal esterification of a substance according to formula (II) wherein $R^1$ and/or $R^2$ contain a hydroxyl group. The present invention, in another embodiment, encompasses taste improving compositions obtainable by the process described above, flavouring compositions comprising these and the use thereof for improving the taste of foodstuffs, beverages, pharmaceutics or oral care products.

The invention is further illustrated by means of the following examples.

EXAMPLES

Example 1

30 g of ethyl lactate and 10 g of GMP were thoroughly mixed in 90 g of glycerol to obtain a clear solution. The mixture was heated under stirring at 120° C. for 1 hour. A white precipitate was formed at the end of the heating period. The mixture was cooled to 70° C. and 100 g of isopropyl alcohol was added followed by stirring. Next, the mixture was filtered over a glass filter and the filter residue was washed three times with 300 g isopropyl alcohol. Thus, 12 g of an almost white powder was obtained. The main taste components of the obtained product were identified using LC-MS and tasting different fractions. Using $^1$H NMR spectroscopy, it was demonstrated that the fractions exhibiting the taste described as "long-lasting" and "kokumi" contained N-lactoyl GMP and O-lactoyl GMP.

Example 2

Three different tomato soup powder compositions were prepared by dry mixing the ingredients as given in table 1.

TABLE 1

| Ingredients | A (Control) | B (50% Reduced salt) | C (Improved version) |
|---|---|---|---|
| Potato starch | 16.9 (g) | 16.9 (g) | 16.9 (g) |
| Tomato powder | 35 (g) | 35 (g) | 35 (g) |
| Sugar | 10 (g) | 10 (g) | 10 (g) |
| Fructose | 5 (g) | 5 (g) | 5 (g) |
| Milk powder | 20 (g) | 20 (g) | 20 (g) |
| Onion powder | 1.6 (g) | 1.6 (g) | 1.6 (g) |
| Garlic powder | 0.1 (g) | 0.1 (g) | 0.1 (g) |
| Carrot Powder | 0.1 (g) | 0.1 (g) | 0.1 (g) |
| MSG | 3.3 (g) | 3.3 (g) | 3.3 (g) |
| Yeast Extract | 1 (g) | 1 (g) | 1 (g) |
| Salt | 7 (g) | 3.5 (g) | 3.5 (g) |
| Maltodextrin | | 3.5 (g) | 3.4 (g) |
| Product as prepared in example 1 | | | 0.1 (g) |
| Total | 100 (g) | 100 (g) | 100 (g) |

10 gram of each composition was mixed with 100 ml hot water to obtain tomato soups. The different soups were tasted and evaluated by a sensory panel. Product C, comprising the product prepared in example 1, was clearly preferred over product B (50% salt reduction). Despite the reduced salt content of product C, the perceived saltiness of the product was comparable to that of product A. Furthermore, the taste of product C was described as having "more taste", "more impact", "more umami", "more kokumi", "long lasting" and "salivating".

Example 3

Three aqueous solutions were prepared:
A. 0.5% NaCl
B. 0.02% product as prepared in example 1
C. 0.5% NaCl and 0.02% product as prepared in example 1
The solutions were tasted by a sensory panel:
Solution A was described as: "salty".
Solution B was described as: "weakly umami", "weakly brothy", "slightly salty", "salivating", "long-lasting".
Solution C was described as: "high impact", "bouillon", "meaty", "salty", "umami", "salivating" and "long-lasting".

Example 4

Two yoghurts were prepared according to the recipe in table 2.

TABLE 2

| Ingredients | Yoghurt A | Yoghurt B |
|---|---|---|
| Yoghurt, 0% fat | 100 g | 100 g |
| Aspartam | 0.02 g | 0.02 g |
| Acesulfam | 0.02 g | 0.02 g |
| Product as prepared in example 1 | — | 0.05 mg |
| Red Fruit Flavour | 0.1 g | 0.1 g |

Both products were tasted and evaluated by a sensory panel. Product B was clearly preferred over product A. Product A was described as sweet, fruity, berry-like, dull and slightly bitter, whereas product B was described as sweet, fuller, more natural berry-like, fruity, more balanced flavour.

The invention claimed is:
1. Flavour composition comprising at least 0.1 wt. % of flavouring substances and between 0.001 and 50 wt. % of one or more taste improving substances according to formula (I) and/or edible salts thereof:

$$R^1—CR^2(OR^3)—CO—X \qquad (I)$$

wherein:
$R^1$ represents hydrogen; $C_1$-$C_8$ alkyl, $C_2$-$C_8$ alkenyl, $C_3$-$C_8$ cycloalkyl or $C_3$-$C_8$ cycloalkenyl or $C_1$-$C_8$ alkyl, $C_2$-$C_8$ alkenyl, $C_3$-$C_8$ cycloalkyl or $C_3$-$C_8$ cycloalkenyl, each substituted with 1-8 substituents selected from hydroxyl, $C_1$-$C_3$ alkyl, $C_2$-$C_3$ alkenyl and $C_1$-$C_3$ carboxyl;

R² represents hydrogen; $C_1$-$C_8$ alkyl, $C_2$-$C_8$ alkenyl, $C_3$-$C_8$ cycloalkyl or $C_3$-$C_8$ cycloalkenyl or $C_1$-$C_8$ alkyl, $C_2$-$C_8$ alkenyl, $C_3$-$C_8$ cycloalkyl or $C_1$-$C_8$ cycloalkenyl, each substituted with 1-8 substituents selected from hydroxyl, $C_1$-$C_3$ alkyl, $C_2$-$C_3$ alkenyl and $C_1$-$C_3$ carboxyl;

R³ represents hydrogen; or $C_1$-$C_3$ acyl or $C_1$-$C_3$ alkyl, or $C_1$-$C_3$ acyl or $C_1$-$C_3$ alkyl each substituted with 1-3 hydroxyl groups;

and wherein X represents either (i) a six membered heterocyclic ring, comprising at least two nitrogen atoms, or a six-membered heterocyclic ring comprising at least two nitrogen atoms is further substituted with one or more substituents selected from the group consisting of amino; hydroxyl; oxo; alkyl; and a monosaccharide unit, or a 6-membered heterocyclic ring comprising at least two nitrogen atoms being further substituted with one or more substituents selected from the group consisting of amino; hydroxyl; oxo; alkyl and a monosaccharide unit, said monosaccharide unit being esterified with one or more mono-, di-, and/or triphosphate groups or (ii) a bicyclic ring system comprising a five membered heterocyclic ring and a six membered heterocyclic ring, each ring comprising at least two nitrogen atoms, or a bicyclic ring system comprising a five membered heterocyclic ring and a six membered heterocylic ring, each ring comprising at least two nitrogen atoms and each ring being further substituted with one or more substituents selected from the group consisting of amino; hydroxyl; oxo; alkyl; and a monosaccharide unit, or a bicyclic ring system comprising a five membered heterocyclic ring and a six membered heterocyclic ring, each ring comprising at least two nitrogen atoms, and each ring further substituted with one or more substituents selected from the group consisting of amino; hydroxyl; oxo; alkyl; and a monosaccharide unit, said monosaccharide unit being esterified with one or more mono-, di- and/or triphosphate groups.

2. The flavour composition according to claim 1, wherein X represents a substituted purine or a pyrimidine radical that is substituted with a pentose monosaccharide unit, or a purine or a pyrimidine radical that is substituted with a pentose monosaccharide unit that is esterified with one or more mono-, di- and/or triphosphate groups.

3. The flavour composition according to claim 1, wherein X represents a purine or a pyrimidine radical substituted with a primary amino group.

4. The flavour composition according to claim 1, wherein X represents a purine or a pyrimidine radical selected from the group of uracil, thymine, cytosine, guanine, adenine, inosine, xanthine, theophylline and theobromine.

5. The flavour composition according to claim 1, wherein R¹ represents $C_2$-$C_8$ alkyl or $C_4$-$C_6$ cycloalkyl, said alkyl or cycloalkyl being substituted with 1-6 hydroxyl groups and/or 1-3 carboxyl groups.

6. The flavour composition according to claim 1, wherein R² represents hydrogen or $C_1$-$C_4$ alkyl.

7. The flavour composition according to claim 1, wherein the taste improving substance is selected from the group consisting of N-lactoyl guanosine monophosphate (GMP), N-lactoyl adenosine monophosphate (AMP), N-lactoyl cytidine monophosphate (CMP), N-lactoyl inosine monophosphate (IMP), N-gluconyl GMP, N-gluconyl AMP, N-gluconyl CMP, N-gluconyl IMP, O-lactoyl-GMP, O-lactoyl AMP, O-lactoyl CMP, O-lactoyl IMP, O-gluconyl OMP, O-gluconyl AMP, O-gluconyl CMP and O-gluconyl IMP and mixtures thereof.

8. The flavour composition according to claim 1, wherein X represents an substituted purine or a pyrimidine radical that is substituted with ribose or deoxyribose, or a substituted purine or a pyrimindine radical that is substituted with ribose or deoxyribose esterified with one or more mono-, di- and/or triphosphate groups.

9. The flavour composition according to claim 2, wherein X represents a purine or a pyrimidine radical substituted with a primary amino group.

10. The flavour composition according to claim 2, wherein X represents a purine or pyrimidine radical selected from the group consisting of uracil, thymine, cytosine, guanine; adenine, inosine, xanthine, theopylline, and theobromine.

11. A process for improving the taste of foodstuffs, beverages, pharmaceutics or oral care products which comprises adding thereto a flavour composition according to claim 1.

12. A product selected from the group consisting of foodstuffs, beverages, pharmaceutics, tobacco products and oral care products, comprising at least 0.5 µg/kg of a taste improving substance according to claim 1 or edible salts thereof.

13. The product according to claim 12, wherein the taste improving substance is selected from the group consisting of N-lactoyl GMP, N-lactoyl AMP, N-lactoyl CMP, N-lactoyl IMP, N-gluconyl GMP, N-gluconyl AMP, N-gluconyl CMP, N-gluconly IMP, O-lactoyl-GMP, O-lactoyl AMP, O-lactoyl CMP, O-lactoyl IMP, O-gluconyl GMP, O-gluconyl AMP, O-gluconyl CMP and O-gluconyl IMP and mixtures thereof.

14. Process of improving the taste of a foodstuff, a beverage, a pharmaceutical product or an oral care product, comprising adding to said foodstuff, beverage, pharmaceutical product or oral care product a taste improving substance according to claim 1 and/or edible salts thereof, in an amount of at least 0.5 µg/kg.

15. Process according to claim 14, wherein the taste improving substance is selected from the group of N-lactoyl GMP, N-lactoyl AMP, N-lactoyl CMP, N-lactoyl IMP, N-gluconyl GMP, N-gluconyl AMP, N-gluconyl CMP, N-gluconyl IMP, O-lactoyl-GMP, O-lactoyl AMP, O-lactoyl CMP, O-lactoyl IMP, O-gluconyl GMP, O-gluconyl AMP, O-gluconyl CMP and O-gluconyl IMP and mixtures thereof.

16. A flavour composition comprising at least 0.1 wt % of flavouring substances and between 0.01 and 10 wt. % of:
one or more taste improving substances according to formula (I) and/or edible salts thereof:

wherein:
R¹ represents hydrogen; $C_1$-$C_8$ alkyl, $C_2$-$C_8$ alkenyl, $C_3$-$C_8$ cycloalkyl or $C_3$-$C_8$ cycloalkenyl or $C_1$-$C_8$ alkyl, $C_2$-$C_8$ alkenyl, or $C_3$-$C_8$ cycloalkyl or $C_3$-$C_8$ cycloalkenyl, each optionally substituted with 1-8 substituents selected from hydroxyl, $C_1$-$C_3$ alkyl, $C_2$-$C_3$ alkenyl and $C_1$-$C_3$ carboxyl;

R² represents hydrogen; $C_1$-$C_8$ alkyl, $C_2$-$C_8$ alkenyl, $C_3$-$C_8$ cycloalkyl or $C_3$-$C_8$ cycloalkenyl or $C_1$-$C_8$ alkyl, $C_1$-$C_8$ alkenyl, or $C_3$-$C_8$ cycloalkyl or $C_3$-$C_8$ cycloalkenyl, each substituted with 1-8 substituents selected from hydroxyl, $C_1$-$C_3$ alkyl, $C_2$-$C_3$ alkenyl and $C_1$-$C_3$ carboxyl;

R³ represents hydrogen; or $C_1$-$C_3$ acyl or $C_1$-$C_3$ alkyl, or $C_1$-$C_3$ acyl or $C_1$-$C_3$ alkyl each optimally substituted with 1-3 hydroxyl groups;

and wherein X represents either (i) a six membered heterocyclic ring, comprising at least two nitrogen atoms, or said 6-membered heterocyclic ring comprising at least two nitrogen atoms is further substituted with one more substituents selected from the group consisting of amino; hydroxyl; oxo; alkyl; and monosaccharide unit, or said 6-membered heterocyclic ring comprising at least two nitrogen atoms is further substituted with one or more substituents selected from the group consisting of amino; hydroxyl; oxo; alkyl and a monosaccharide unit, said monosaccharide unit being esterified with one or more mono-, di- and/or triphosphate groups; or (ii) a bicyclic ring system comprising a five membered heterocyclic ring and a six membered heterocyclic ring, each ring comprising at least two nitrogen atoms, or said heterocyclic five membered ring and said six membered heterocylic ring, each ring of which comprising at least two nitrogen atoms and each ring being optionally further substituted with one or more substituents selected from the group consisting of amino; hydroxyl; oxo; alkyl; and a monosaccharide unit, or a bicyclic ring system comprising a five membered heterocyclic ring and a six membered heterocyclic ring, each ring comprising at least two nitrogen atoms, and each ring further substituted with one or more substituents selected from the group consisting of amino; hydroxyl; oxo; alkyl; and monosaccharide unit, said monosaccharide unit optionally being esterified with one or more mono-, di- and/or triphosphate groups.

17. A product selected from the group consisting of foodstuffs, beverages, pharmaceutics, tobacco products and oral care products, comprising at least 1 µg/kg of a taste improving substance according to claim 1 or edible salts thereof.

* * * * *